(12) United States Patent
Foltin et al.

(10) Patent No.: US 12,001,183 B2
(45) Date of Patent: Jun. 4, 2024

(54) SCALABLE MICROSERVICES-DRIVEN INDUSTRIAL IoT CONTROLLER ARCHITECTURE

(71) Applicant: HEWLETT PACKARD ENTERPRISE DEVELOPMENT LP, Houston, TX (US)

(72) Inventors: Martin Foltin, Ft. Collins, CO (US); William Edward White, Ft. Collins, CO (US); Aalap Tripathy, Houston, TX (US); Harvey Edward White, Jr., Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 114 days.

(21) Appl. No.: 17/186,678

(22) Filed: Feb. 26, 2021

(65) Prior Publication Data

US 2022/0276627 A1    Sep. 1, 2022

(51) Int. Cl.
*G05B 19/042* (2006.01)
*G06F 9/54* (2006.01)

(52) U.S. Cl.
CPC ......... *G05B 19/0423* (2013.01); *G06F 9/544* (2013.01); *G06F 9/546* (2013.01);
(Continued)

(58) Field of Classification Search
CPC ..... G06F 9/546; G06F 9/544; G05B 19/0423; G05B 2219/21063; G05B 2219/25257
See application file for complete search history.

(56) References Cited

U.S. PATENT DOCUMENTS

| 6,112,246 A | * | 8/2000 | Horbal | ...................... H04L 9/40 |
| | | | | 707/E17.112 |
| 9,372,752 B2 | | 6/2016 | Das Sharma | |
| (Continued) | | | | |

FOREIGN PATENT DOCUMENTS

CN        109144932 A   *   1/2019    .........   G06F 13/4234

OTHER PUBLICATIONS

Blyler, J., "Microservices Connect Legacy Assets to the IIoT," May 18, 2018, 5 pgs., website accessed Jan. 27, 2021, https://www.insight.tech/industry/microservices-connect-legacy-assets-to-the-iiot?utm_content=buffer07f46&utm_medium=social&utm_source=twitter.com&utm_campaign=Kenton%20EIC%20Social.
(Continued)

*Primary Examiner* — Charles E Anya
(74) *Attorney, Agent, or Firm* — Sheppard Mullin Richter & Hampton LLP

(57) ABSTRACT

Systems and methods are provided for enabling coexistence of Information Technology (IT) systems and Operational Technology (OT) systems, where advanced computing functionality realized by the IT systems can be applied to legacy applications and incumbent hardware technologies resident in the OT systems. A distributed control node (DCN) implemented between the IT and OT systems may comprise a microcontroller system partitioned into two processor clusters. Microservices associated with the IT systems are provisioned to a high performance processor cluster, and legacy applications running bare metal associated with the OT systems are provisioned to a real-time processor cluster. Partitioning of the microcontroller system allows for interoperability between the microservices and the legacy applications.

21 Claims, 6 Drawing Sheets

(52) U.S. Cl.
CPC .............. *G05B 2219/21063* (2013.01); *G05B 2219/25257* (2013.01)

(56) References Cited

U.S. PATENT DOCUMENTS

| | | | |
|---|---|---|---|
| 9,477,524 B2 | 10/2016 | Kang | |
| 2005/0015625 A1* | 1/2005 | Inoue | G06F 21/57 712/203 |
| 2007/0255814 A1* | 11/2007 | Green | H04L 67/51 709/223 |
| 2013/0326541 A1* | 12/2013 | Scaffidi, Jr. | H04L 69/321 719/321 |
| 2017/0187785 A1* | 6/2017 | Johnson | H04L 51/42 |
| 2018/0115635 A1* | 4/2018 | Ahuja | H04L 63/0428 |
| 2018/0159959 A1* | 6/2018 | Shrider | G05B 19/05 |
| 2019/0294636 A1* | 9/2019 | Albrecht | G06F 16/9038 |
| 2019/0334789 A1* | 10/2019 | Roche | G06F 11/3447 |
| 2020/0097430 A1* | 3/2020 | Maturana | G06F 13/4068 |
| 2020/0233961 A1* | 7/2020 | Wolfin | G06F 11/3495 |
| 2020/0387144 A1* | 12/2020 | Nixon | G06F 9/3017 |

OTHER PUBLICATIONS

Ciavotta, M. et al., "A Microservice-based Middleware for the Digital Factory," 27th International Conference on Flexible Automation and Intelligent Manufacturing, FAIM2017, Procedia Manufacturing, Jun. 27-30, 2017, pp. 931-938, vol. 11, https://www.sciencedirect.com/science/article/pii/S2351978917304055/pdf?md5=8320a2b5dadf6b0d7a093ddd0859ee40&pid=1-s2.0-S2351978917304055-main.pdf. Elsevier B. V. . . . Modena. Italy.

Hendrix, J., "Modernizing Applications with OpenShift and CI/CD Pipelines (Case Study)," Jul. 24, 2020, 8 pgs., website accessed Jan. 27, 2021, https://shadow-soft.com/modernizing-applications-openshift-cicd-pipelines/.

Koltovich, S., "How to Modernize Legacy Applications for a Microservices-Based Deployment," Dec. 21, 2017, 18 pgs., website accessed Jan. 27, 2021, https://thenewstack.io/modernize-legacy-applications-keep-update-re-write-needs-re-written/.

* cited by examiner

SCALABLE MICROSERVICES-DRIVEN INDUSTRIAL IoT CONTROLLER ARCHITECTURE

DESCRIPTION OF RELATED ART

The Internet of Things (IoT) is term used to describe an interconnected network of physical objects or "things" that can gather and exchange data over the Internet (or other network(s)). IoT devices can be those "things," e.g., sensors, actuators, gadgets, appliances, systems, etc. that can be programmed to have a certain functionality, and that can transmit data over the Internet (or other network(s)). IoT devices may connect to computing devices or other IoT devices to transmit and receive data, and are typically manufacturer-specific.

Advances in Artificial Intelligence (AI), high speed connectivity e.g., WiFi 6, 5G, etc., as well as advances in computing performance have led to opportunities to expand data processing infrastructures, and to deploy new data-driven services to help automate process flows, improve equipment life, manage supply chains, enable self-driving vehicles, and so on. The growing volume of data due to the increasing prevalence of IoT device usage also contributes to the desire to expand data processing infrastructures and the deployment of new data-driven services.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
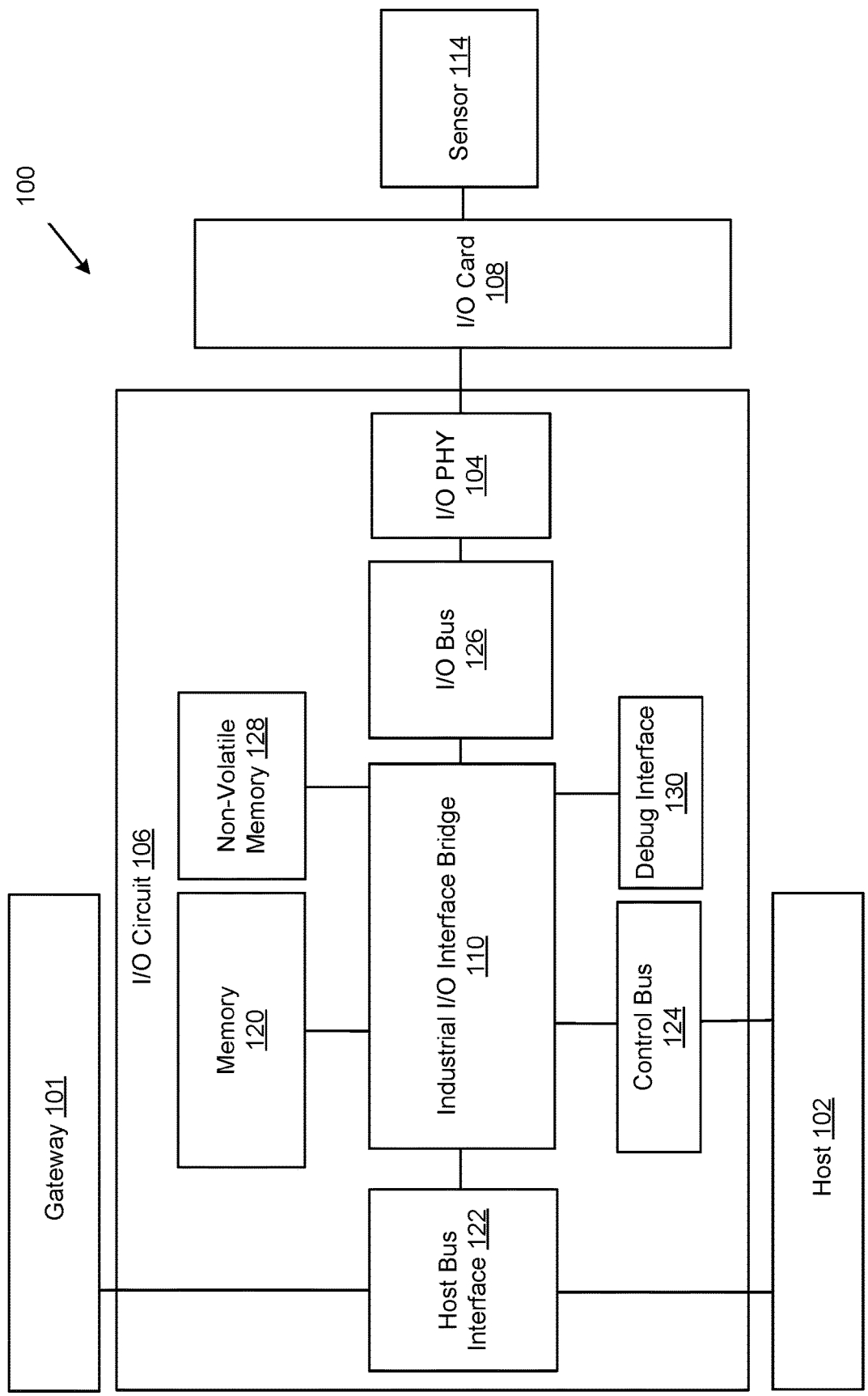
FIG. 1 illustrates an example of a computer system, in accordance with an embodiment of the present disclosure.

The figures are not exhaustive and do not limit the present disclosure to the precise form disclosed.

DETAILED DESCRIPTION

Various embodiments are directed to a computer system architecture that enables the integration of legacy applications (often associated with mission-critical Operations Technology (OT)) with newer/more recent Industrial IoT (IIoT)-related microservices. That is, legacy applications, e.g., various types of industrial processes, motion control mechanisms, timing-critical applications, and the like used in IIoT, transportation/mobility, and other contexts can co-exist with new microservices for centralized infrastructure management, enhanced security, industrial process monitoring, interfacing to intelligent Artificial Intelligence (AI)-driven control, etc. This coexistence/hardware-software co-design is estimated to lead to a desired convergence of Information Technology (IT) and OT infrastructures that ultimately enable companies such as manufacturing, energy and transportation companies to deploy new data-driven services to better automate process flows, improve equipment life, enable self-driving vehicles, and implement smart infrastructures.

That is, a legacy application may be loaded onto a first partition of a microcontroller system, which can be referred to as a real-time (RT) domain (described in greater detail below). A microservice provisioned to a second partition of the microcontroller domain, which can be referred to as a high performance (HP) domain (also described in greater detail below), can monitor data provided by the legacy application through an inter-processor communication mechanism/protocol. Data processing, analytics, or running high-level control algorithms can be performed in the HP domain. Thus, processed data can be passed to external systems/outside world (e.g., advanced computing platforms/upper levels of an IIoT system) or control commands can be passed back to the legacy application.

For example, a legacy application may be run in a first partition of a microcontroller system as it collects time-critical readings from a sensor. The legacy application runs in the first partition, which can be referred to as a real-time (RT) domain (described in greater detail below) in which applications, like the legacy application can run "bare metal" or in a Real-Time Operating System (RTOS) For example, the legacy application may need to be able to respond quickly to new sensor readings or adjust an actuator(s) controlling an industry process, as well as turn off a related piece of equipment/system after receiving problematic sensor readings or a shut-down signal. A microservice running in a second microcontroller system partition, referred to as a high performance (HP) domain, also described in greater detail below, may monitor a data stream fed by the legacy application. The microservice may utilize advanced computing techniques, e.g., artificial intelligence (AI) to look for anomalies in the sensor data stream that could be caused by a failing sensor or security breach resulting in replacement of the sensor. The microservice can also send control commands back to the legacy application, for example, to reconfigure control algorithm when sensor readings suggest out-of-specification operations. Separating the microcontroller system into two domains allows the legacy application to maintain its critical timing requirements because there is no operating system (i.e., running bare metal) introducing unpredictable timing or there is a specialized RTOS, while the microservice is allowed to process the data and utilize services of a "normal" operating system to communicate with external systems/the outside world, and perform more advanced analytics.

Such a computer system architecture is premised on dividing a processor system, e.g., a multi-core microcontroller system, into two domains, each comprising its own computing or processor clusters. In this context, a cluster may be representative of a collection of processors, that are part of a microcontroller, all of which are running bare-metal or on an RTOS or all of which are running a standard OS. Typically, all processors in a cluster are the same model processor. The microcontroller HP domain may operatively connect to a host processor system implemented in a "higher" IIoT tier in which newer microservices may be provisioned, while legacy applications can be provisioned to a microcontroller RT domain that can serve direct-connected Input/Output (I/O) devices. Despite the separation, memory can be shared between the microcontroller HP and RT domains, and the computing clusters therein may interact with one another through an inter-processor communication mechanism configured to avoid interference and security issues.

In some embodiments, this two-domain architecture may further include optional programmable logic in the form of a field-programmable gate array (FPGA) that may be operatively connected to the RT domain. Such an FPGA may enable dynamic reconfiguration of I/O card interfaces for different types of I/O cards. In some embodiments, the FPGA may alternatively, or may additionally be operatively connected to the HP domain, where, e.g., the FPGA may include AI logic used in the HP domain, as well as interface logic used in the RT domain. In such an example, the AI microservice running in the HP domain may employ AI acceleration on the FPGA, while at the same time a control algorithm running in the legacy application in the RT domain may employ I/O interface controllers or even a PID (Proportional Integral Derivative) algorithm on another part of the same FPGA. This is possible due to the ability to partition the FPGA to multiple independent hardware partitions not interfering with each other. However, if a very high degree of functional safety is desired for the RT domain, these two different functions can be implemented in two separate, smaller FPGAs, one connected to the RT domain and the second one to the HP domain.

As used herein, a "device" refers to an apparatus or other article that is adapted for a particular purpose or multiple purposes. Examples of IoT devices include sensors, computing devices, IoT-enabled devices, IIoT-enabled devices, etc., which may be included on a virtualized architecture or a non-virtualized architecture. As used herein, "IoT-enabled devices" include devices embedded with electronics, software, sensors, actuators, or network connectivity which enable such devices to connect to a network or exchange data. As used herein, IIoT-enabled devices refer to IoT-enabled devices that are used in industrial applications, such as manufacturing or energy management for example. Examples of IoT-enabled devices include sensors, vehicles, monitoring devices, devices enabling intelligent shopping systems, manufacturing devices, among other cyber-physical systems. A management server may manage the operation of multiple devices in an environment and/or rely on information from IIoT and/or IoT-enabled sensors.

As used herein, a "microservice" refers to a modular service architected to operate independently, have a very specific purpose, and use a well-defined interface to communicate with other services or applications. Examples of microservices include, but are not limited to, anomaly detection, noise filtering, active health monitoring, outer control loop of a soft-programmable logic controller (PLC), and software management.

As used herein, a "legacy application" refers to software which was architected to operate existing OT sensors and/or actuators, and run on "old technology" hardware. Examples include control software for industrial processes such as oil refineries, manufacturing hardware, and mining equipment, and time-critical processes such as aircraft control or autonomous vehicle control.

As alluded to above, there is a growing desire to merge IT and OT infrastructures. However, one challenge to this merging of infrastructures arises when attempting to interface with and update legacy infrastructures that involve proprietary 3$^{rd}$ party microcontrollers and software interfaced to I/O devices. As also noted above, these 3$^{rd}$ party microcontrollers often run legacy applications that are mission critical. Accordingly, these originally closed infrastructures may need to be opened up for centralized management, industrial process monitoring, and for interfacing with new control processes or loops.

For example, I/O expansion cards and software may be integrated with a system to improve collection, digitization, and operation on data, yet technical issues arise in interacting with various legacy systems. These legacy systems may utilize a large variety of industrial I/O protocols and legacy I/O cards (e.g., analog to digital, digital to analog, industrial Ethernet—TTE/TSN/ProfiNet, etc.), where different protocols are used between different devices in a distributed, expansive system. Accordingly, the connectivity may be streamlined for IoT devices, as described herein, by using a universal industrial I/O interface bridge, such as an FPGA, programmed with a learning neural network accelerator logic. The universal industrial I/O interface bridge may be placed between an x86 host Converged Edge platform and I/O interface cards to translate and manage electronic communications from these and other sources.

FIG. 1 illustrates an example a computer system 100, in accordance with an embodiment of the application. Computer system 100 may include gateway 101, host 102, input/output (I/O) module 106, I/O cards 108, and sensors or actuators 114. In some instances, for the sake of brevity, the term "sensor" may be used to refer to either a sensor or an actuator. Computer system 100 may include an FPGA, complex programmable logic device (CPLD), or any other type of programmable hardware.

Gateway 101 may be a component that communicatively couples multiple devices, such as a computing device, a printer, a wireless computing device, a switch, IoT device, etc. with computer system 100. As used herein, the term "communicatively coupled" or "operatively coupled" refers to a device being coupled directly, indirectly, (wired or wirelessly) to another component or element, e.g., the gateway, such that signals and/or data may be transmitted and/or received. For example, gateway 101 may be an embodiment of an intelligent gateway, a programmable logic controller, or similar componentry. As used herein, the term "intelligent gateway" refers to a device or application that serves as a connection point between intelligent devices. As used herein, the term "programmable logic controller" refers to an industrial computing device that has been adapted to work in harsh conditions to control manufacturing processes.

Host 102 may comprise a computer system based on an instruction set architecture, including x86 architecture. Computer system 100 may implement a gateway to host 102 and/or pass data directly to host 102. In some examples, host 102 may be implemented as local (PCIe or USB connected) host or remote (ethernet connected) host. In some examples, host 102 may be implemented as a hybrid model with some control local within a virtual PLC running on host 102, and some in I/O module 106.

I/O cards 108 may be an interface that allows sensor 114 to communicate with other components of computer system 100. I/O Card 108 may contain circuitry to help transport data from the sensor 114 to other components in the computer system 100. In some examples, I/O cards 108 may transport data from the sensors 114 to the gateway 101 through I/O circuit 106. In some examples, I/O cards 108 may comprise direct I/O, including general purpose input/output (GPIO), analog to digital (A-D), or digital to analog (D-A). In some examples, I/O cards 108 may comprise an I/O protocol, including 4 to 20 milliamp (mA) I/O, a Highway Addressable Remote Transducer (HART) transducer protocol, Profinet, or Ethernet for Control Automation Technology (EtherCAT). In some examples, I/O cards 108 may comprise third party I/O, including programmable logic controller (PLC) or programmable controller vendors that may implement a variety of communication protocols.

Sensor 114 may provide data to gateway 101, host 102, or I/O circuit 106 via I/O cards 108. Typically, one or more sensors 114 may be connected to a single I/O card 108. However, in some examples, sensor 114 may be connected to multiple I/O cards 108, e.g., in aviation, where one sensor/actuator can be connected to multiple time triggered Ethernet ports. In various examples, computer system 100 may include a plurality of sensors, collectively referred to as sensors 114.

I/O circuit 106 may provide a path that data sent by a sensor travels to reach a set destination. I/O circuit 106 may connect gateway 101 to the I/O cards 108 which allows I/O cards 108 to communicate with gateway 101. In addition, I/O circuit 106 may allow I/O cards 108 to transmit data from sensor 114 to the gateway 101. Similarly, I/O circuit 106 may connect host 102 to the I/O cards 108 and allow the I/O cards to transmit data from sensor 114 to the host.

I/O circuit 106 may comprise various components, including host bus interface 122, control bus 124, I/O bus 126, memory 120, non-volatile memory 128, I/O PHY 104, debug interface 130, and industrial I/O interface bridge 110. In some examples, a CPU may not be included on I/O circuit 106 (e.g., implemented within gateway 101 or host 102) and data may be transmitted through I/O circuit 106 and scanned by industrial I/O interface bridge 110.

I/O circuit 106 further comprises host bus interface 122 and control bus 124. In some examples, I/O circuits is a PCI bus-compliant interface card adapted for coupling to the PCI bus of host 102, or adapted for coupling to a PXI (PCI eXtension) bus. Host bus interface 122 and control bus 124 may present a PCI or PXI interface. In other examples, I/O circuits is an interface card or a stand-alone module connected to the USB or Ethernet interface of host 102.

I/O bus 126 may present a RTSI (Real Time System Integration) bus for routing timing and trigger signals between I/O circuit and one or more other devices or cards, including gateway 101, host 102, or I/O cards 108.

Figure 5:
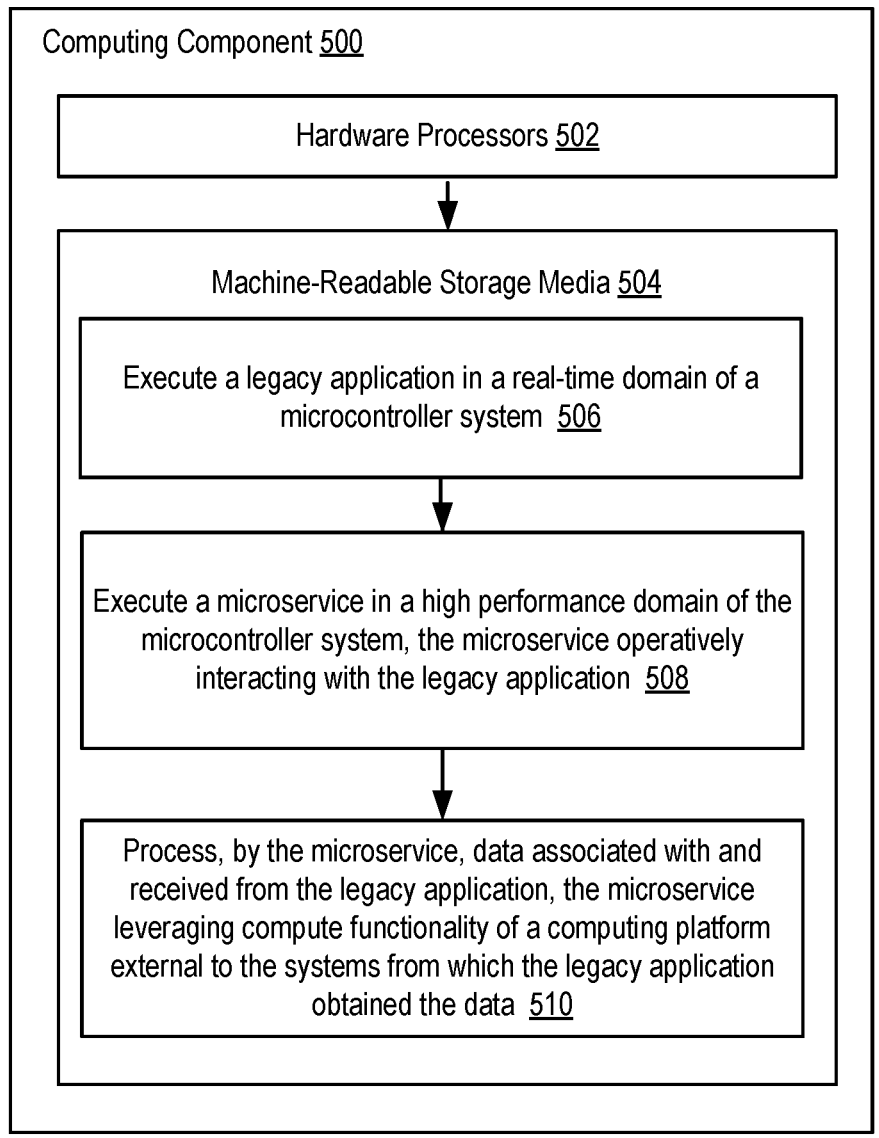
FIG. 5 illustrates a computing component for enabling legacy application and microservice interoperability in accordance with embodiments of the application.
Figure 6:
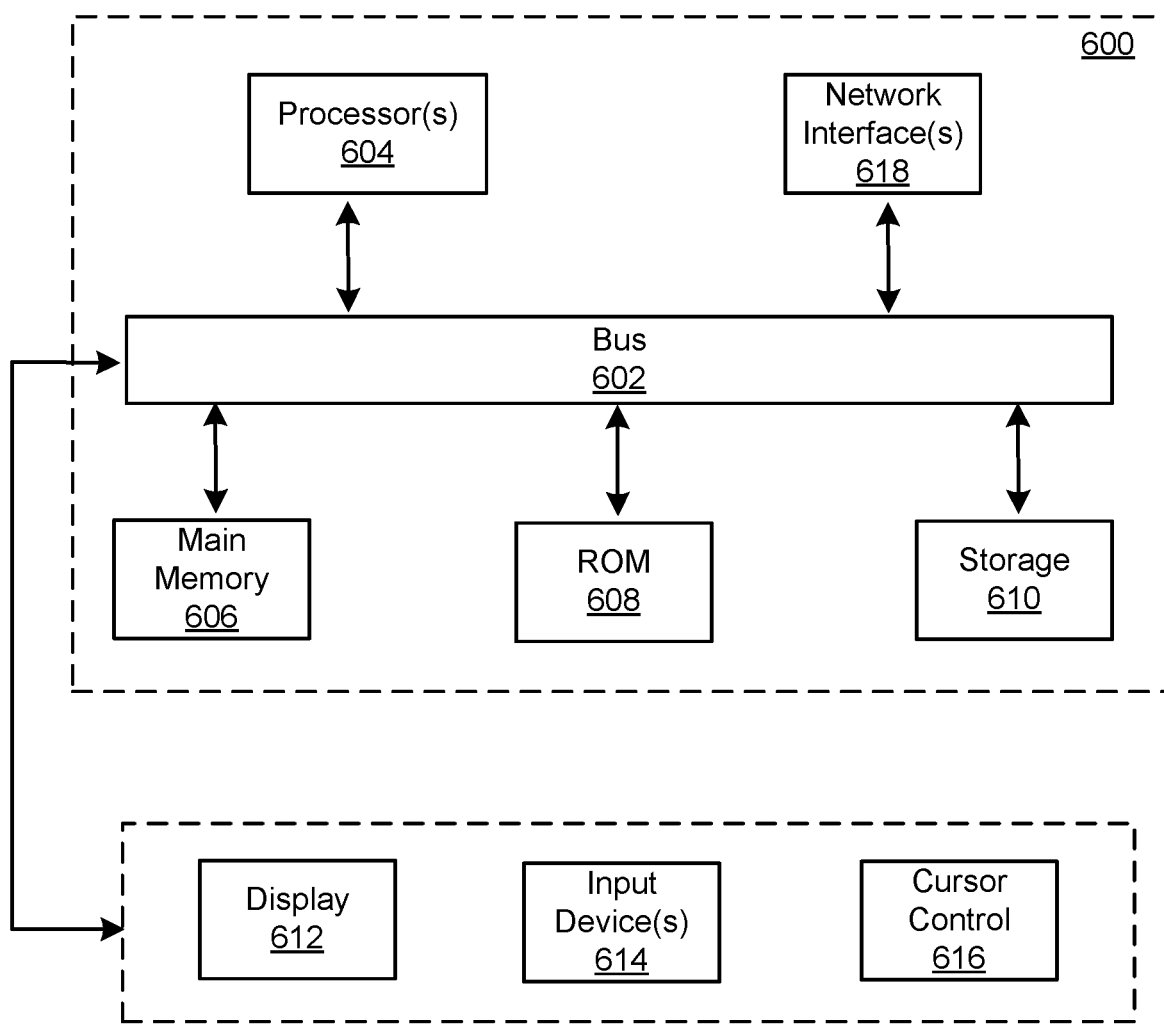
FIG. 6 is an example computing component that may be used to implement various features of embodiments described in the present disclosure.

Memory 120 may store computer-executable instructions to be compiled into machine language for execution by a processor, as described in greater detail with FIG. 5 or 6. The computer-executable instructions may be provided in addition to a program being converted into a hardware implementation form in I/O circuit 106. Memory 120 may also buffer data passing through Industrial I/O Interface Bridge 110, and store intermediate results of data processing preformed in the Bridge.

Non-volatile memory 128 may employ a memristor, other resistive random-access memory (ReRAM), conductive bridging random-access memory (CBRAM), phase change random-access memory (PCRAM), Flash, or similar technologies. Non-volatile memory 128 may be operable to store the hardware description received from host 102 to enable execution of the hardware description prior to or during booting of the computer system. Non-volatile memory 128 may also store computer-executable instructions that are loaded to memory 120 for execution by a processor.

I/O PHY 104 may correspond to physical connector ports between I/O circuit 106 and I/O cards 108. I/O PHY 104 may comprise one or more connectors for receiving signals. In some examples, I/O PHY 104 may present analog and/or digital connections for receiving or providing analog or digital signals. I/O PHY 104 can be a logical port, such as TCP/IP ports for common services such as 8080 for HTTP, or a virtual port in a virtual server network or other software-defined environment. I/O PHY 104 may include electronic circuitry that converts signal voltage levels between those of I/O Bus 126 and I/O Card 108. I/O PHY 104 may also facilitate conversion between voltage-driven signaling and current-driven signaling, such as, for example, the 4-20 mA current loop. I/O PHY 104 may also provide translation between a parallel communication bus and a serial interface bus.

Debug interface 130 may comprise a Joint Test Action Group (JTAG) standard interface that may be used for testing and maintenance of Industrial I/O Interface Bridge 110.

Industrial I/O interface bridge 110 may scan data from sensors 114 to convert the data from a first format to a second format. Industrial I/O interface bridge 110 may comprise, for example, a microcontroller or an FPGA.

I/O circuit 106 may allow flexibility to connect to a wide range of I/O devices while also supporting traditional industrial busses, such as Fieldbus Protocol Types, Profibus, Profinet, EtherCAT, HART (e.g., over 4-20 mA loops, etc.), Modbus, and Modbus TCP. I/O circuit 106 may implement logic block libraries to house hardware implementation for popular functions (e.g., PID, DSP, and AI models, etc.). For example, these libraries may comprise C/C++ code running on a processor or Register Transfer Logic (RTL) or synthesized C/C++ representations of popular functions compiled to an FPGA bitstream.

Figure 2:
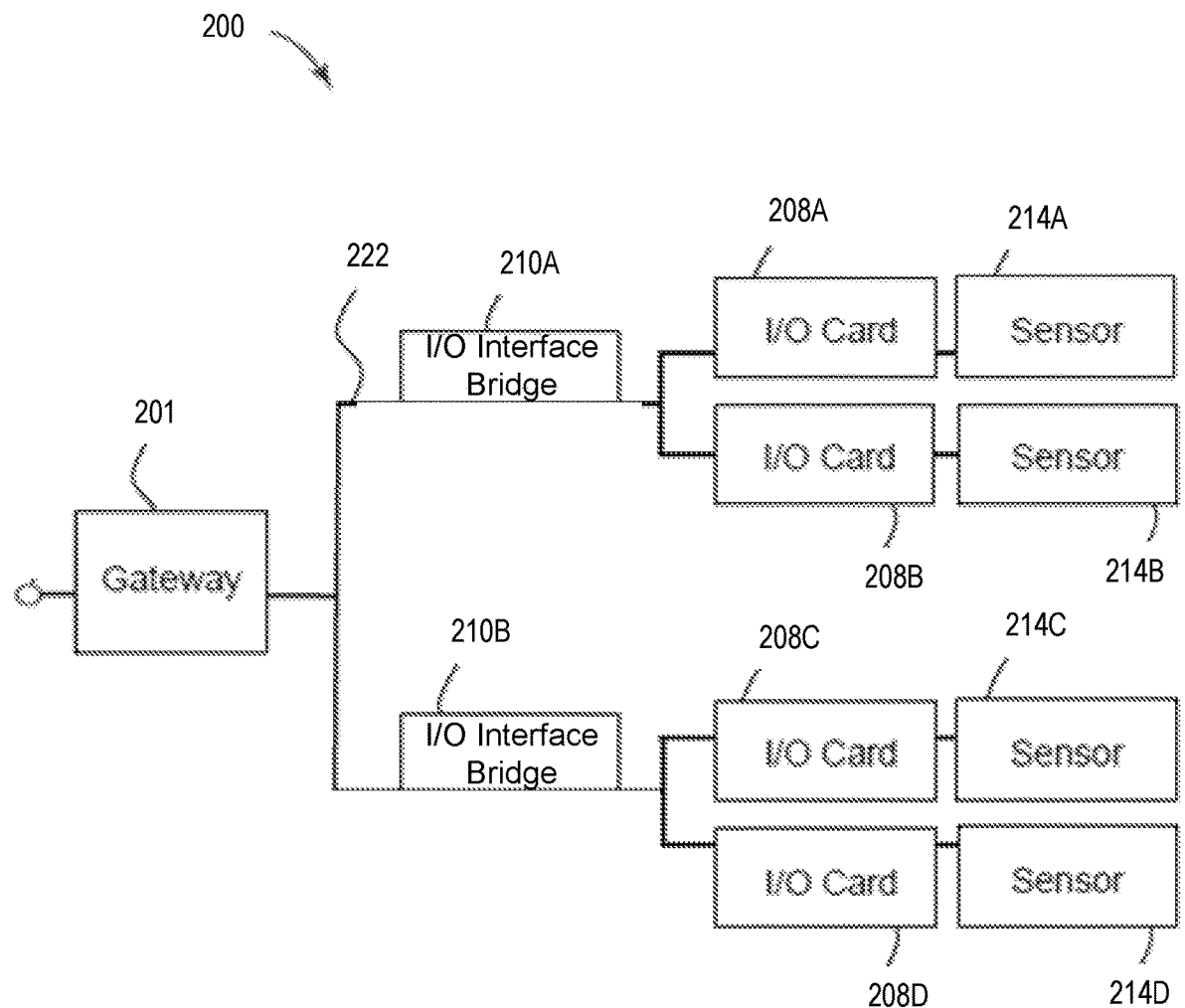
FIG. 2 illustrates an example of a computer system, in accordance with an embodiment of the present disclosure.

FIG. 2 illustrates another example of a computer system, in accordance with an embodiment of the application. Components of computer system 200 may correspond with several components of computer system 100 in FIG. 1. For example, gateway 101, industrial I/O interface bridge 110, I/O cards 108, and sensors 114 of FIG. 1 may correspond with gateway 201, industrial I/O interface bridge 210 (illustrated as a plurality of industrial I/O interface bridge 210A, 210B), I/O cards 208 (illustrated as a plurality of I/O cards 208A, 208B, 208C, 208D), and sensors 214 (illustrated as a plurality of sensors 214A, 214B, 214C, 214D) of FIG. 2, respectively. FIGS. 1 and 2 may illustrate similar computer systems with similar industrial I/O interface bridges, but shown in different formats to provide a more detailed description of embodiments described herein.

In some examples, computer system 200 may include a plurality of industrial I/O interface bridges 210. Each industrial I/O interface bridge 210 may be connected to a plurality of I/O Cards 208. Further, each I/O Card 208 may be connected to one or more sensors 214. That is, each industrial I/O interface bridge 210 may be connected to a plurality of legacy sensors through a plurality of I/O Cards. Each industrial I/O interface bridge 210 may be connected to a separate port of a host bus interface connected to the gateway 201.

For example, first sensor 214A may be connected to first I/O card 208A which is connected to first industrial I/O interface bridge 210A. Second sensor 214B may be connected to second I/O card 208B which is connected to first industrial I/O interface bridge 210A. Similarly, third sensor 214C may be connected to third I/O card 208C which is connected to second industrial I/O interface bridge 210б, and a fourth sensor 214D may be connected to fourth I/O card 208D which is connected to second industrial I/O interface bridge 210б. Further, first industrial I/O interface bridge 210A and second industrial I/O interface bridge 210б may both be connected to gateway 201 through host bus interface 222.

In the IoT/IIoT context, sensors 114/214 may detect or sense events, states, changes, etc. in its immediate environment, and can convert such physical phenomena, e.g., light, movement, presence of a substance(s), etc. into electrical signals that can be interpreted. Sensors 114/214 (in the actuator sense) may operate inversely, i.e., by interpreting electrical signals, e.g., from a control system, and converting those electrical signals into mechanical motion, for example, to change or introduce change to its immediate physical surroundings (e.g., opening/closing valves, emitting some notification, etc.).

On the other side of gateway 101/201, as noted above, systems, other IoT devices, computing devices, etc. may comprise upper IIoT tiers. Such IIoT tiers can include, e.g., systems/platforms on which data sensed by sensors 114/214 can be analyzed, and where controls can be generated based on the data to be transmitted to sensors 114/214 to effectuate some action(s), and where rules/controls can be managed and enforced regarding such systems, IoT devices, etc. Thus, sensors 114/214 are able to sense data at a network edge, where that data can be communicated to the upper IIoT tiers, as well receive controls based on analysis of the data in the upper IIoT tiers.

As alluded to above, there is a desire to merge IT and OT to enable the insertion/implementation of AI and advanced analytics into control processes, equipment maintenance, and so on. Accordingly, and considering an example of such a framework, the Open Process Automation standard (OPAS), the upper IIoT tiers containing the advanced computing platform(s) effectuating the AI/advanced analytics (in other words, IT) may be interfaced to the lower level distributed control systems (DCSs), devices, etc. which can include sensors 114/214, bridges, I/O interfaces, etc. (in other words, OT, which can refer to incumbent technologies/vendor-supplied devices/functionality). Residing between this lower level and the upper IIoT tiers, are distributed control nodes (DCNs) which can combine certain functionality of DCS I/O devices or controllers on a smaller level to effectuate small control functions. It is in such DCNs where the aforementioned split or partitioned microcontroller architecture (RT domain and HP domain) may be implemented, thereby allowing conventional OT to merge with IT.

Figure 3:
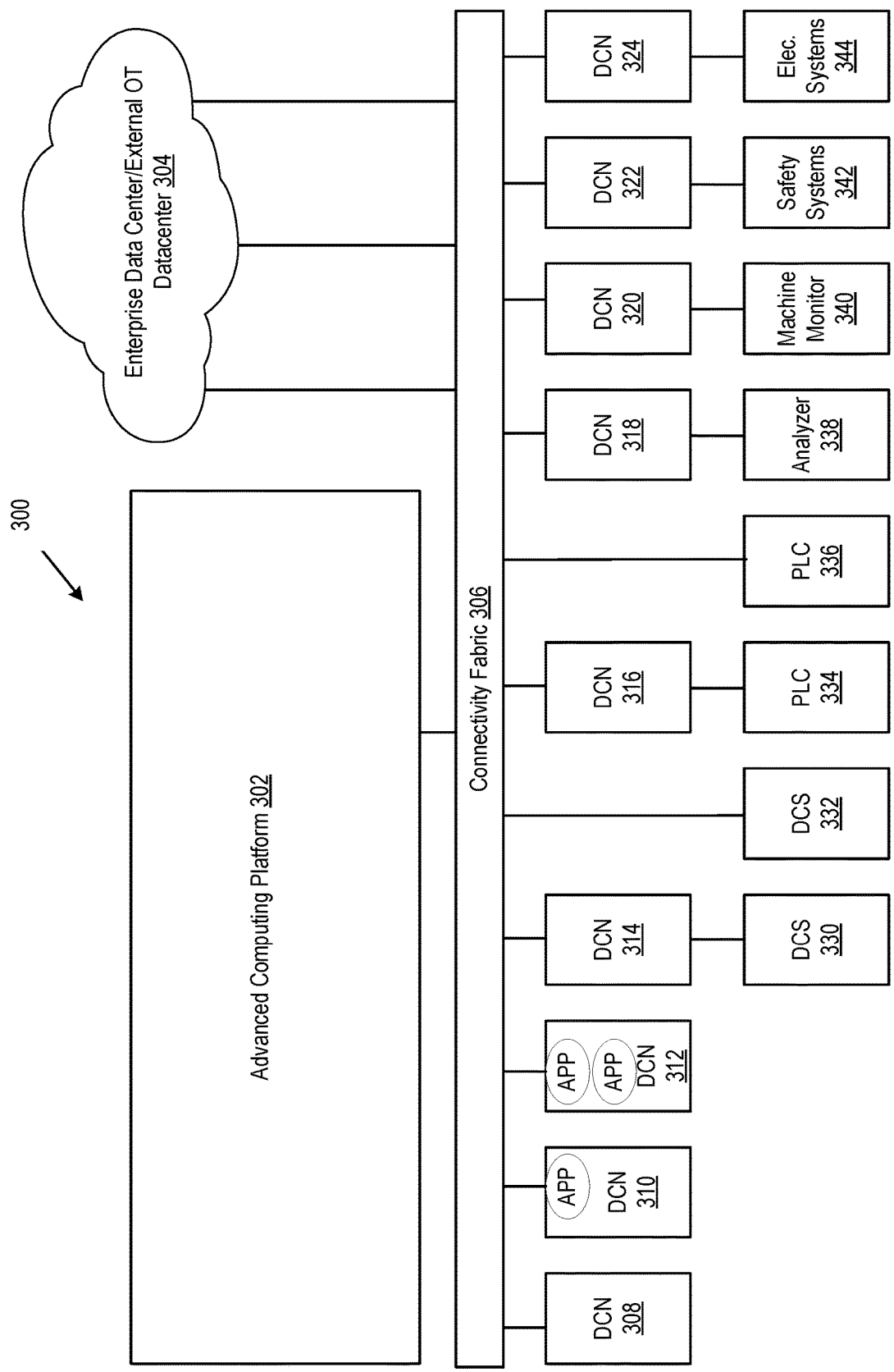
FIG. 3 illustrates an example of Information Technology (IT) and Operations Technology (OT) coexistence infrastructure in accordance with an embodiment of the present disclosure.

FIG. 3 illustrates an example of IT and OT infrastructure coexistence architecture 300. As alluded to above, industries such as the manufacturing industry desire to achieve interoperability between IT and OT infrastructure in context of legacy applications running on/with incumbent technologies supplemented by advanced computing capabilities that can be delivered, for example, via microservices. As illustrated in FIG. 3, architecture 300 may include an advanced computing platform 302, additional platforms/systems, such as enterprise IT and external OT datacenters 304. Advanced computing platform 302 may include, e.g., soft controllers, converged edge system appliances that can collect data from IoT devices/systems, e.g., sensors and PLCs, for integration into the cloud/on-premise enterprise systems.

One implementation of architecture 300 may be an architecture following the OPAS framework (noted above). Accordingly, connectivity between the upper IIoT tier including advanced computing platform 302 and enterprise IT and external OT datacenters 304 and lower tiers may be effectuated through a connectivity fabric 306, which can be an OPAS connectivity fabric (OCF). On the other side of connectivity fabric 306 resides a plurality of DCNs 308-324. DCNs 308-324 may be operatively connected to DCSs, e.g., DCS 330 and 332, PLCs 334, 226, and other systems/devices, such as an analyzer 338, machine monitor 340, safety systems 342, and electrical systems 344.

It should be understood that a host processor system (or simply host/host system) can refer to a system that performs data aggregation and effectuates process control functions, as well as performs higher performance analytics. In some embodiments, a DCN can be implemented in such a way that the DCN encompasses both the host processor system, and an industrial I/O interface bridge. More than one industrial I/O interface bridge can be connected to a host processor system (for increased scalability, i.e., enabling the DCN to connect to more I/O devices). In various embodiments, the control and analytic functions can be distributed between the host processor system and an industrial I/O interface bridge, e.g., more latency-sensitive control loops can be run in the industrial I/O interface bridge.

In other embodiments, a DCN may encompass only one or more industrial I/O interface bridges, while the aforementioned upper IIoT tier can include the host processor system. In such an implementation, it should be understood that the host processor system typically refers to a larger computer system connected to multiple industrial I/O interface bridges, where process control functions may be performed primarily on the multiple industrial I/O interface bridges, while outer control loops may still be performed by the host processor system.

The OPAS architecture is a multi-tiered hierarchical architecture, where DCNs are typically implemented at the lowest tier, although may be included in a next higher IIoT tier (which handles higher level functions). Both of the aforementioned embodiments are compliant/consistent with this OPAS architecture. As will be discussed in greater detail below, the communication protocol used between a host processor system and an industrial I/O interface bridge can be the same as that used by OPAS between lowest tier DCNs and next tier DCNs/advanced computing platforms/business platforms, i.e. the OPC-UA protocol, although as described herein, other protocols such as HART-IP, may be used. Additionally, the partitioning of the microprocessor system into the RT and HP domains allows the HP domain to subsume functionality that would, in other architectures, only be possible to implement in a host processor system, making the embodiment wherein one or more industrial I/O interface bridges are implemented in a lowest tier DCN and the host processor system is implemented in a next DCN tier feasible. Thus, running an OPC-UA server and performing low-level analytics or certain control loops can occur at the industrial I/O interface bridge in a lowest tier DCN.

Figure 4:
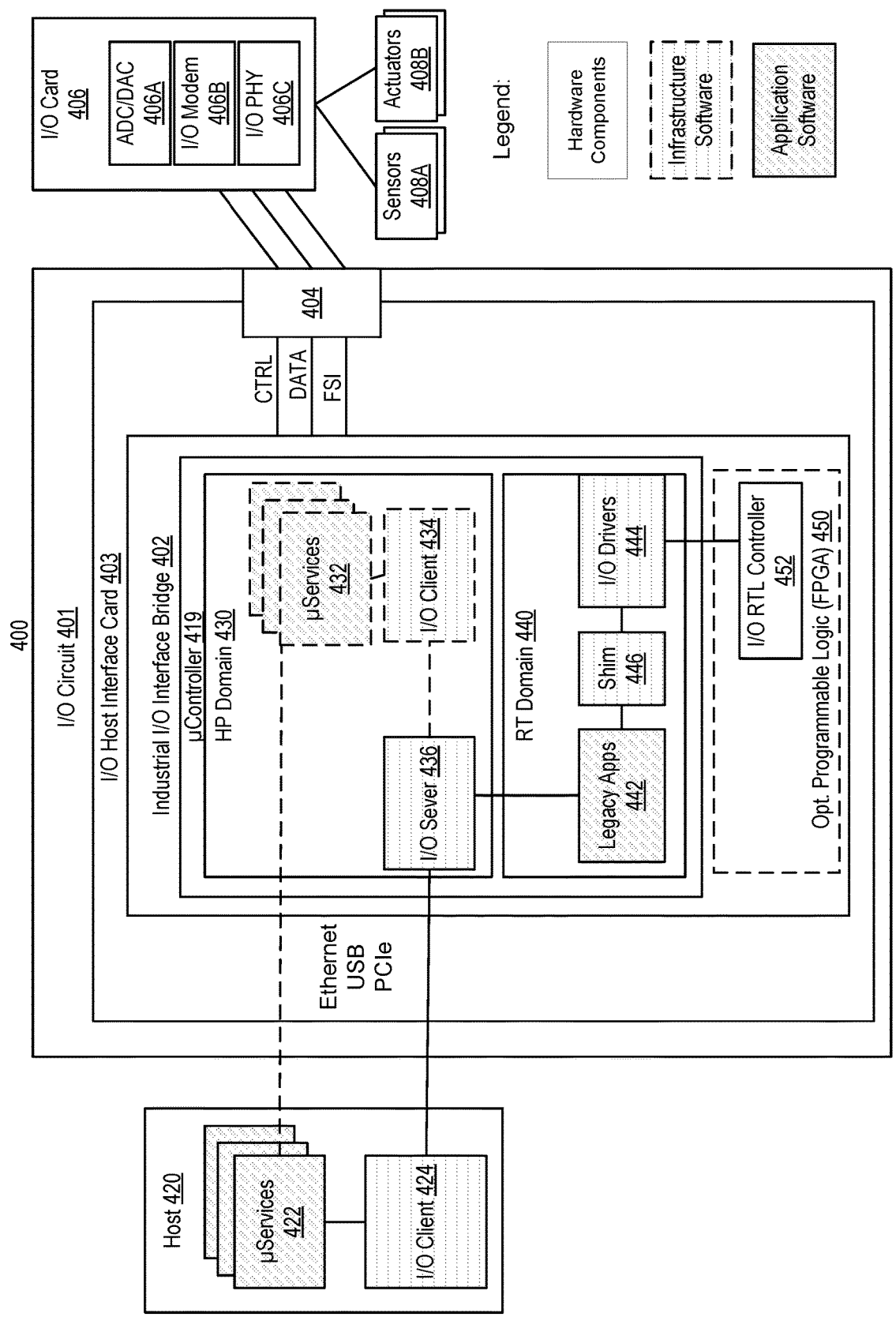
FIG. 4 illustrates an example partitioned microcontroller of an industrial I/O interface bridge, in accordance with an embodiment of the present disclosure.

As noted above, various embodiments are directed to a partitioned microcontroller architecture (making up an industrial I/O bridge) that enables legacy applications to be supplemented with new/newer microservices. FIG. 4 illustrates an example of such a partitioned microcontroller architecture. Components of computer system 400 in FIG. 4 may correspond with certain components of computer system 100 in FIG. 1. For example, industrial I/O interface bridge 110, I/O PHY 104, I/O card 108, and sensors 114 of FIG. 1 may correspond with industrial I/O interface bridge 402, I/O PHY 404, I/O card 406, and sensors 408 (illustrated as a plurality of sensors 408A, and actuators 408B) of FIG. 4, respectively. It should be noted that industrial I/O interface bridge 402, via FPGA 450 (described below in greater detail), may effectively function as a translator, e.g., protocol translator, between host 420 and the following components of I/O card 406: analog to digital (ADC) and digital to analog (DAC) converter 406A; I/O modem 406B; and I/O physical interfaces 408C which connect to sensors 408A and actuators 408B.

In some examples, industrial I/O interface bridge 402 may be implemented as a hardware module between host 420 (e.g., the processor, etc.) and I/O cards 406 (e.g., I/O drivers and receivers, etc.), as part of an I/O Host Interface Card 403. It should be understood that industrial I/O interface bridge 402 is implemented to enable such electronic communications without independent customization of host 420 and I/O cards 406.

Due to the configurability of industrial I/O interface bridge 402, the interface logic can be changed by updating the code that is loaded in industrial I/O interface bridge 402. Updating the code can occur transparently to the user to abstract away the underlying physical interface. By using industrial I/O interface bridge 402, the signal pins between industrial I/O interface bridge 402 and I/O cards 406 are reconfigurable as to direction and function. One set of signals can be defined as a side-band Field Replaceable Unit (FRU) Service Interface (FSI) that can aid in detecting and identified the I/O card type.

Industrial I/O interface bridge 402 may be reconfigured based on one or more components in the microcontroller 419 and the optional Programmable Logic 450. For example, the physical I/O interface receivers and drivers (e.g., I/O PHY 404) may be turned on for specific I/O pins used by the discovered interface. They may be configured to use correct voltage levels and direction (e.g., input, output, or bi-directional, etc.).

The I/O controller hardware may be reconfigured. For example, a bitstream may be loaded that programs the configurable logic blocks in the Programmable Logic 450 to form logic gates and interconnect of the controller hardware. This controller may implement a specific I/O protocol. Industrial I/O interface bridge 402 can electronically communicate with I/O PHY 404 pins with the protocols. Among other things, the protocol determines which I/O pins are sending or receiving data, and at what times, achieving a proper hand-shake between industrial I/O interface bridge 402 and the connected I/O devices.

The specific I/O protocol may have multiple layers. For example, the lowest layer can use FSI, I2C, SPI, UART, GPIO or other communication standard. The next layer may include higher level functions, for example, HART, or other protocols. Different I/O devices may communicate with different protocols, therefore the I/O discovery process can identify the protocol type used by the connected device.

The controller hardware code can be incorporated with Register Transfer Logic (RTL) hardware description language or RTL I/O Controller (used interchangeably). The RTL can describe the state machines forming the controller. This representation may be synthesized to logic gates and interconnect, then sent to industrial I/O interface bridge 402 as a bitstream to implement these gates in configurable logic blocks. The bitstreams may be stored for different protocols in a non-volatile memory connected to industrial I/O interface bridge 402. After I/O discovery, the correct protocol bitstream may be loaded to industrial I/O interface bridge 402.

Components in the microcontroller 419 may be reconfigured as well. For example, I/O software drivers may run on embedded processor cores as bare metal or under an operating system kernel and interface to the I/O controller hardware, as described below. The I/O alert software driver servicing I/O alert pins may be updated. For example, the I/O alert pins may trigger sending a low latency, high priority message from industrial I/O interface bridge 402 to host processor system 420.

A portion of I/O circuit 401 may be reconfigured based on output of two I/O device discovery mechanisms, including a FSI side-band interface driven method and an inventory method. In the first method, the FSI management interface (e.g., Field Replaceable Unit Service Interface or "FRU SI") is polled periodically to monitor what I/O device types are attached. The FPGA may be reconfigured when a new device is discovered. The FSI management interface may be standardized across many I/O devices, even though these I/O devices can have different data I/O interfaces. The FSI may be configured at power-up and remain on constantly. During reconfiguration, the FSI may not be touched, but the data I/O interfaces may be reconfigured. For I/O devices not supporting the FSI, the second method may be used, including an inventory based I/O discovery method. In this method, the Programmable Logic (FPGA) 450 is iteratively reconfigured trying sequentially different interface and protocol types until a successful communication with the I/O device is established. The interface types are loaded from an inventory in an intelligent order, to avoid overdriving I/O interface pins. For example, the low voltage interfaces (such as, 1.8V) may be tried first, which may be followed with higher voltage (3.3V, 5V, and so on) interfaces. The I/O pins may be configured first to test if the connected signal is a receiving, driving, or a multi-driven net. With either of the two I/O device discovery mechanisms, the FPGA may be reconfigured at power-up time and can be reconfigured again if high error rates or loss of communication is detected on I/O interfaces, which may be indicative of I/O device change.

Microcontroller partitioning, as contemplated herein, may enable monitoring, management, data analytics, data pre-processing, and AI integration to be realized in a control loop between the upper IIoT tiers and the actual sensors/actuators. As illustrated in FIG. 4, industrial I/O interface bridge 402 may comprise a microcontroller 419 which in turn, comprises a first HP domain 430 and a second RT domain 440. As noted above, legacy, time-sensitive applications (legacy applications 442) can be provisioned to the RT domain 440, while new microservices 432 can be provisioned to HP domain 430. HP domain 430 and RT domain 440 each comprise processor clusters in microcontroller 419 (a multi-core microcontroller system). The separate clusters share memory and interact with each other through an inter-processor communication mechanism avoiding interference and security issues.

Legacy applications 442 are able to run bare metal or under an RTOS. That is, legacy applications 442 can run on hardware/a computing core, in this case, on RT domain 440 of microcontroller 419 without a base OS, e.g., only with firmware/BIOS or no other software at all. Moreover, legacy applications 442 can execute with very minimal modifications relative to their original environment. At the same time, new microservices 432 may be deployed on the HP domain 430 under the Linux OS. With this arrangement, the RT domain 440 can be provisioned from the HP domain 430 using the Linux "remoteproc" framework. It should be understood that the remoteproc framework can refer to a remote processor framework that allows different platforms/architectures to control (power on/off, load firmware, start/stop) remote processors while abstracting any differences in hardware (and negating the need to duplicate device drivers). As would be understood by those of ordinary skill in the art, the remoteproc framework is part of a standard Linux kernel, and an associated remoteproc messaging protocol/mechanism can be used to control the start/stop of a remote process.

In this context, the remote processors can be the processor cluster making up the RT domain, and thus, HP domain 430, through the remoteproc framework, can control the RT domain 440. That is, the legacy applications 442 may be loaded, started, and stopped dynamically depending on I/O devices connected to the microcontroller 419, thereby extending the dynamic provisioning mechanisms described above to load the RT domain code. It should be noted that although embodiments are described as using the remoteproc frawework, the remoteproc framework is merely one example of a control scheme/mechanism that can be used to allow HP domain 430 to control RT domain 440. Those of ordinary skill in the art may leverage/use other control mechanisms to achieve this control functionality.

In particular, microcontroller 419 may be booted up into the Linux OS in HP domain 430. The Linux remoteproc system command may start the RT domain 440. It should be understood that the Linux OS kernel is aware of certain reserved memory for RT domain 440. Thus, code is written into reserved memory region for the RT domain 440, and RT domain 440 becomes operative.

The inter-processor communications between the two domains/clusters (RT domain 440 and HP domain 430) can be implemented using a "libmetal" mechanism or protocol allowing messages to be passed through the shared memory. Upstream message transfers are triggered by interrupt from the RT domain 440 to the HP domain 430, while downstream message transfers are triggered by polling from the RT domain 440 to minimize disruption of any time-sensitive legacy application(s) behavior. That is, using libmetal, data can be passed up from RT domain 440 to HP domain 430, where when RT domain 440 has data to send to HP domain 430, RT domain 440 writes the data to the shared memory, and issues an interrupt to HP domain 430. HP domain 430 catches the interrupt (via an interrupt handler), runs the interrupt handler that retrieves the data from HP domain 430's portion of the shared memory, and may perform operations on that data.

Although, typical use of libmetal involves mirrored operations in the upstream and downstream directions (using interrupts), when data is transferred from HP domain 430 to RT domain 440 through downstream messaging, a polling mechanism rather than an interrupt mechanism is used. Instead of RT domain 440 running an interrupt handler to catch interrupts issued by HP domain 430, RT domain 440 polls HP domain 430 for data at periodic intervals when RT domain 440 needs or is ready to receive data. Polling may comprise reading a flag in shared memory associated with a counter that counts how many data transactions occurred between HP domain 430 and RT domain 440. The flag indicates when the counter has been incremented relative to the last polling cycle/interval, indicating that new data from HP domain 430 is available, at which point, RT domain 440 pulls that new data from shared memory. The libmetal mechanism is modified in this way to avoid latency associated with use of an interrupt handler at a time when a legacy application 442 in RT domain 440 is to perform some mission critical operation, e.g., involving sensors 408A/actuators 408B.

Although in many cases, both clusters will be part of the same microcontroller 419, in some embodiments, different hardware may be used to implement RT domain 440 and HP domain 430. Regardless of such embodiments, however, at least a portion of memory is shared between the two domains to effectuate communications therebetween. Moreover, other communication mechanisms/protocols may be leveraged instead of libmetal, and so embodiments described as using libmetal are merely examples and not meant to be limiting.

It should be understood that in conventional/previous implementations of an industrial I/O interface bridge, microcontroller 419 is/was implemented as a single processor system, where software is used to load code in programmable logic (PL), e.g., a FPGA (e.g., FPGA 210A, 210B) and dynamically update programmable logic controllers (I/O or FSI RTL controllers) and I/O device drivers, depending on what I/O devices may have been connected to the FPGA. It should be understood that such conventional/previous implementations use software (running under the OS) to load an FPGA bitstream and start associated drivers and other software. In other words, using software to load code in this context can refer to managing hardware and software to implement the type of interface being used, e.g., SPI, I2C, HART, etc. However, and in accordance with various embodiments, the associated drivers and other software represent the code (legacy applications) that runs in the RT domain. Thus, the use of libmetal provides an existing mechanism for processes running under Linux to communicate with processes running on processors outside of Linux, i.e., libmetal can interface between Linux and non-Linux processors. Also, remoteproc provides an existing mechanism to control what is running on these processors outside of Linux. Moreover, as discussed above, the HP domain 430 is now able to manage/configure the RT domain 440, e.g., effectuating at least one aspect of the IT/OT merger, where the upper IIoT tiers can better interact with/inject improvements into incumbent I/O devices and legacy applications.

In some embodiments, the hardware of microcontroller 419 may be different from hardware originally used by the legacy applications. It should be understood that hardware in this context may include processor cores, memory and I/O devices, in other words, compute hardware. When this is the case, in some embodiments, a software shim 446 may be implemented between legacy applications 442 and I/O (firmware) drivers 444 of the new hardware platform making up microcontroller 419. It should be understood that software shim 446 may comprise a library that can transparently intercept API calls and change passed arguments, handle certain operations, or redirect certain operations. In this way, software shim 446 is able to effectuate the porting of legacy applications 442 for interoperability with microcontroller 419 (and microservices 432), which again, may comprise new/different hardware than that on which legacy applications 442 may have originally executed. In this way, legacy applications 442 may operatively communicate/interact with the upper IIoT tiers via HP domain 430 while still retaining the ability to operatively communicate/interact with I/O devices, e.g., sensors 408A, actuators 408B. Although different I/O card suppliers may use a variety of different high level protocols, software shim 446 typically supports, concurrently, a relatively small number of physical interface types, usually some type(s) of GPIO, UART, SPI, I2C, or RMII/GMII Ethernet. In some embodiments, software shim 446 may also support timer and interrupt controller APIs.

As further illustrated in FIG. 4, microservices may be provisioned either on the host 420, which may be an edge server/host system (e.g., microservices 422) or directly in HP domain 430 of microcontroller 419 (e.g., microservices 432). This is enabled by a server-client architecture with one or more I/O client subscribers, e.g., I/O client 434 and I/O client 424, and an I/O server 436 running on HP domain 430. That is, I/O client 424 and I/O client 434 both may subscribe to the same I/O server, i.e., I/O server 436. This allows for the offloading of some microservices from host 420 to HP domain 430 of microcontroller 419. Such microservices 432 may comprise, for example, data pre-processing functions (e.g., noise reduction, filtering), side-band data analytics (e.g., sensor security, anomaly detection), outer control loop of a soft-PLC, management, active health monitoring, etc. This ability to offload at least some microservices enables better system scalability since multiple low-cost microcontroller systems can be interfaced to one host (as noted above). The server-client model also provides a reliable communication interface between host 420 and microcontroller 419, taking advantage of the high I/O throughput of typical IT interfaces (Ethernet, USB) and enforcing proper re-timing of messages and their characters or symbols in I/O server 436 before sending them to RT domain 440.

It should be noted that communications between HP domain 430 and host 420 may be effectuated over IP, e.g., using Ethernet IP, IP over USB, or PCIe, for example. In some embodiments, such Ethernet IP/IP over USB connections may be implemented over a single physical/wired connection using different IP ports. Communication protocols used over these Ethernet IP/IP over USB connections can comprise existing communication protocols, e.g., the aforementioned OPC-UA or HART-IP. In previous/conventional architectures, specific I/O device drivers were needed at the host system. Various embodiments, however, remove this need/complexity at the host system by communicating over IP to support the use of a partitioned microcontroller. That is, the complexity typically associated with the inclusion of I/O device drivers at a host system can be removed, where typically, a custom I/O device driver to interact with a legacy application would be implemented in a non-partitioned microcontroller system. Additionally, a corresponding I/O device driver would need to be implemented in the host system. In accordance with various embodiments, however, I/O device drivers 444 can be implemented solely in RT domain 440, now made possible with the aforementioned IP-based connections/communications between host 420 and partitioned microcontroller 419. Ultimately, lower latency and high data volume applications/microservices may be run on microcontroller 419, while compute-intensive applications/microservices may be run on host 420.

The legend of FIG. 4 denotes hardware components, infrastructure software, and application software. It should be understood that infrastructure SW components can be reused across multiple implementations in manufacturing, energy, mobility, smart building, smart city, etc. applications. As such, their API interfaces and use contexts may be standardized in the future. These infrastructure SW components may have a hardware-agnostic layer and a hardware-specialized layer to support broad range of hardware microcontroller and host architectures. Conversely, the application software components may be different for different industrial applications and for different application domains, i.e., developed for specific range of use cases.

In some embodiments, optional programmable logic in the form of an FPGA 450 may provide certain benefits to the partitioned microcontroller architecture disclosed herein. First, inclusion of FPGA 450 enables dynamic I/O reconfigurability, where the same microcontroller, i.e., microcontroller 419, can be used for I/O cards, e.g., I/O card 406, from different suppliers or vendors. Thus, depending on the scenario/industry/context of use, different I/O cards may be mixed and matched to achieve a desired configuration, without relying on multiple, separate microcontroller systems to support each I/O supplier. It should be noted, however, that the use of separate microcontrollers is possible and contemplated in accordance with other embodiments, so long as those microcontrollers adhere to the same partitioned architecture. It should be understood that this mixing and matching of I/O cards can occur one at a time or simultaneously. Because FPGA 450 is programmable hardware, it may have one or more interfaces, and they need not necessarily be the same.

Second use of FPGA 450 results in the ability to replace discrete I/O components with RTL hardware representations synthesized on the FPGA, thereby lowering the cost of implementing computer system 400, improving reliability, and enabling a smaller form factor. For example, this can replace external I/O modems or other components. As discussed above with regard to FIG. 4, RTL hardware representations (I/O RTL controller 452) may be used to describe state machines forming I/O components, in this case, an I/O controller. This RTL representation may be synthesized to logic gates and interconnect, then sent to industrial I/O interface bridge 402 as a bitstream to implement these logic gates in configurable logic blocks.

An example of a practical use case scenario is described next. As noted above host 420 may be an edge server. In this example, the edge server may be running OT Link platform software that will access HART-connected sensors and actuators (embodied in sensors 408A and actuators 408B) via the HART-IP protocol enabling transmission of messages over common Ethernet. For example, a HART sensor may be used to measure vibration frequencies. In this example, a HART-IP reference client (embodying I/O client 424) may be running on host 420. An example of a microservice 422 running on host 420 may be a user interface through which a customer/user may control/manage/interact with the HART-connected sensors and actuators. An FPGA bridge (embodying FPGA 450) may be implemented between microcontroller 419, which may be an integrated ARM microcontroller, and a discrete HART modem embodying (I/O modem 406B), as well as a 4-20 mA ADC/DAC (embodying ADC/DAC 406A) connected to the HART-connected sensors and actuators. For example, the HART modem on I/O card 406 may modulate ADC/DAC waveforms from the HART sensors. Accordingly, industrial I/O interface bridge 402 may act as a HART-IP to HART protocol translator, with the ability to also perform side-band data monitoring, in-line data pre-processing, and implement industrial control loops. Microcontroller 419 is partitioned into RT and HP domains (embodying RT domain 440 and HP domain 430) made up of ARM Cortex R5 and Cortex A53 clusters, respectively, sharing a DRAM memory.

In this example, the A53 HP domain/cluster runs a HART-IP server (embodying I/O server 436), that communicates with the HART-IP client on host 420 over IP. The Cortex R5 RT cluster runs a legacy application that implements a HART Link Layer and services the HART modem, and the ADC and DAC discrete components. The main process loop of this legacy application may be slightly updated to receive HART messages and transmit HART responses from/to the A53 HP cluster through an inter-processor communication mechanism as already described above (modified libmetal mechanism). The HART-IP Reference Implementation Development Kit may be used as a basis for the HART-IP server software, the code of which has been ported from a Raspberry-Pi implementation to a Xilinx microcontroller. Accordingly, a software shim (embodying software shim 446) can be used to translate the legacy I/O device driver API calls to Xilinx calls. Again, such a software shim provides translation for GPIO, UART, SPI, and I2C interfaces as well as timers and interrupt controllers.

The result is that by adding half-duplex digital modulation via the HART modem to the 4-20 mA analog signal, multiple data variables from a HART sensor over a single 4-20 mA wire pair can be measured, and the HART sensor may also be calibrated and configured. Practically, this can significantly increase the utility of 4-20 mA current loops without need to change the existing wiring.

FIG. 5 illustrates a computing component for providing a universal industrial I/O interface bridge, in accordance with embodiments of the application. Computing component 500 may be, for example, a server computer, a controller, microcontroller, or any other similar computing component capable of processing data. In the example implementation of FIG. 5, the computing component 500 includes hardware processors 502, and machine-readable storage medium 504. In some embodiments, computing component 500 may be an embodiment of a system corresponding with computer system 100 of FIG. 1.

Hardware processors 502 may be one or more central processing units (CPUs), semiconductor-based microprocessors, and/or other hardware devices suitable for retrieval and execution of instructions stored in machine-readable storage medium 504. Hardware processors 502 may fetch, decode, and execute instructions, such as instructions 506-514, to control processes or operations for optimizing the system during run-time. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a NAND-Flash or NOR-flash memory, a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processors 502 may execute instruction 506 to execute a legacy application a real-time domain of a microcontroller system. As noted above, the microcontroller system may embody a DCN within an IT/OT coexistence architecture or system framework. The legacy application may obtain data from devices/systems, such as existing or incumbent sensors, monitoring systems and the like in some industrial setting, smart buildings, etc. Additionally, the legacy application can run bare metal or in an RTOS, and thus avoid any latency/timing issues that might appear if the legacy application were forced to run on a standard OS.

Hardware processors 502 may execute instruction 508 to execute a microservice in a high performance domain of the microcontroller system, the microservice operatively interacting with the legacy application. It should be understood that hardware processors 502 may comprise processor/computing clusters of the microcontroller system. As described above, operative interaction between the microservice and the legacy application can be achieved through inter-processor communication mechanisms, one example of which is libmetal.

Hardware processors 502 may execute instruction 510 to process, by the microservice, data associated with and received from the legacy application. For example, the legacy application may obtain sensor data, whereas the microservice may by using advanced computing to detect anomalous behavior of the sensor from which the legacy application is receiving data, and which may need to respond to the issue/problem immediately. The microservice may leverage the functionality of a computing platform external to the system from which the legacy application received the data. Referring back to FIG. 3, such an external computing platform can be advanced computing platform 302 in an upper IIoT tier of the IT/OT coexistence architecture.

FIG. 6 is an example computing component that may be used to implement various features of embodiments described in the present disclosure. FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a solid state disk (SSD), magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, bitstreams, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A microcontroller system, comprising:
    a first microcontroller domain;
    a second microcontroller domain to which one or more legacy applications are provisioned; and
    wherein the first microcontroller domain is operatively connected to a host processor system over a communications protocol, and wherein one or more microservices are provisioned to at least one of the first microcontroller domain and the host processor system;
    wherein the second microcontroller domain is operatively connected to one or more input/output (I/O) devices adapted to execute the one or more legacy applications generating data in conjunction with the one or more microservices executed by the at least one of the first microcontroller domain and the host processor system, the one or more microservices performing microservices-specific computing on the generated data; and
    wherein the first and second microcontroller domains communicate during deployment of the one or more legacy applications and the one or more microservices while maintaining operational separation between the first and second microcontroller domains, the second microcontroller domain effectuating deployment of the one or more legacy applications in one of a bare metal or real-time operating system mode, and the first microcontroller domain concurrently effectuating deployment of the one or more microservices using a standard operating system, wherein the first and second microcontroller domains communicate by passing messages comprising the data generated by the second microcontroller domain to the first microcontroller domain through memory shared between the first and second microcontroller domains.

2. The microcontroller system of claim 1, wherein the first microcontroller domain controls the second microcontroller domain using a remote processor control framework.

3. The microcontroller system of claim 2, wherein the remote processor control protocol powers remote processors on and off, loads firmware onto the remote processors, starts and stops the one or more legacy applications on the remote processors, and abstracts hardware differences between the first microcontroller domain and the second microcontroller domain.

4. The microcontroller system of claim 1, wherein the first microcontroller domain comprises a first cluster of processors and the second microcontroller domain comprises a second cluster of processors.

5. The microcontroller system of claim 1, wherein the first microcontroller domain comprises an input/output (I/O) server-client architecture including an I/O server to which I/O clients subscribe.

6. The microcontroller system of claim 5, wherein the first microcontroller domain includes a first I/O client, and wherein the host processor system comprises a second I/O client for implementing microservices offloaded from the first microcontroller domain.

7. The microcontroller system of claim 6, wherein the first microcontroller domain and the host processor system communicate over the communications protocol, the communications protocol comprising Internet Protocol (IP) implemented over a wired or wireless connection using a plurality of IP ports, the plurality of IP ports enabling communication to the one or more microservices provisioned to the host processor system and communication to the second I/O client.

8. The microcontroller system of claim 1, wherein the passing of messages through the memory shared between the first and second microcontroller domains comprises an inter-processor communications protocol.

9. The microcontroller system of claim 8, wherein the inter-processor communications protocol executes upstream message transfers from the second microcontroller domain to the first microcontroller domain, wherein the second microcontroller domain writes data to the memory shared between the first and second microcontroller domains and issues an interrupt to the first microcontroller domain, and wherein an interrupt handler of the first microcontroller domain retrieves the data from the memory shared between the first and second microcontroller domains.

10. The microcontroller system of claim 8, wherein the inter-processor communications protocol executes downstream message transfers from the first microcontroller domain to the second microcontroller domain, wherein the second microcontroller domain polls the first microcontroller domain at periodic intervals to obtain data from the memory shared between the first and second microcontroller domains.

11. The microcontroller system of claim 1, wherein the second microcontroller domain comprises corresponding I/O drivers for the one or more I/O devices.

12. The microcontroller system of claim 11, wherein the second microcontroller domain comprises a software shim implemented between the one or more legacy applications and the corresponding I/O drivers effectuating porting of the one or more legacy applications for operability with the first microcontroller domain.

13. The microcontroller system of claim 12, wherein the software shim comprises a library performing at least one of transparent interception of application programming interface (API) calls, changing passed arguments, handling operations, and redirecting operations between the one or more legacy applications and the corresponding I/O drivers.

14. The microcontroller system of claim 12, further comprising a programmable logic component implemented between I/O cards corresponding to the one or more I/O devices and the second microcontroller domain.

15. The microcontroller system of claim 14, wherein the programmable logic component comprises a field programmable gate array (FPGA) comprising I/O controllers communicating between the corresponding I/O drivers and the I/O cards via I/O card interfaces.

16. The microcontroller system of claim 15, wherein the FPGA enables dynamic reconfiguration of the I/O card interfaces for different types of the I/O cards.

17. The microcontroller system of claim 1, wherein the second microcontroller domain comprises time-critical sensor readings, and the first microcontroller domain is configured to monitor sensor data which is provided by the one or more legacy applications and which corresponds to the time-critical sensor readings.

18. The microcontroller system of system 1, wherein the first microcontroller domain comprises a real-time domain, and wherein the second microcontroller domain comprises a high performance domain supporting advanced computing unperformable by the one or more legacy applications.

19. A method, comprising:
    deploying a legacy application in a first domain of a microcontroller system using one of a bare metal or real-time operating system mode;
    concurrently deploying a microservice in a second domain of the microcontroller system using a standard operating system, the microservice operatively interacting with the legacy application; and
    processing, by the microservice, data associated with and received from the legacy application, the microservice leveraging compute functionality of a computing platform external to and different from the systems from which the legacy application obtained the data, while maintaining operational separation between the first and second domains.

20. The method of claim 19, further comprising communicating between the first and second domains of the microcontroller system using an interrupt and polling communications mechanism allowing data sharing between the first and second domains of the microcontroller system over a shared memory.

21. The method of claim 19, wherein the first domain comprises time-critical sensor readings, and the second domain is configured to monitor sensor data which is provided by the legacy application and which corresponds to the time-critical sensor readings.

* * * * *